March 10, 1959   H. POSCHNER ET AL   2,877,397
LOOP REGULATING SYSTEMS FOR THE SPEED CONTROL OF ROLL DRIVES
Filed Nov. 5, 1954
Fig. 1
(PRIOR ART)
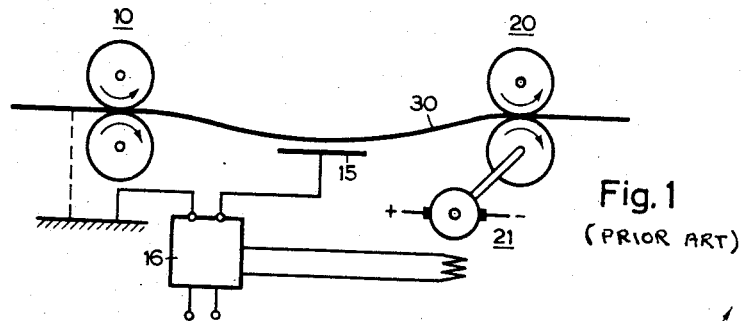
Fig. 2
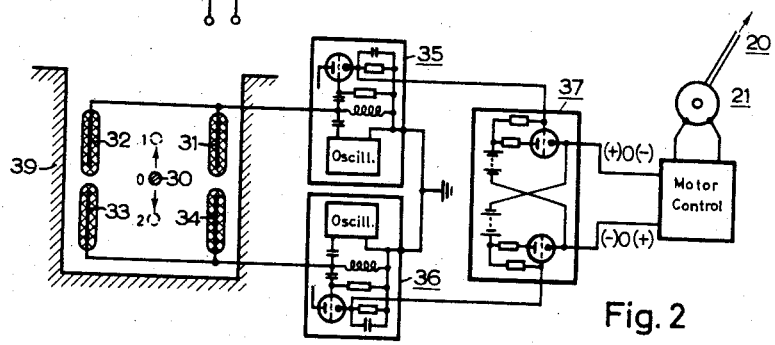
Fig. 3
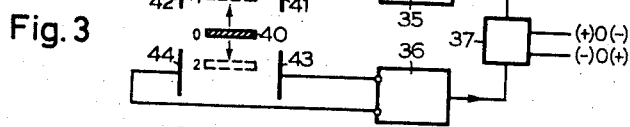
Fig. 4
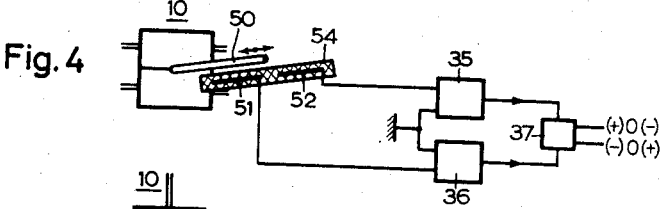
Fig. 5
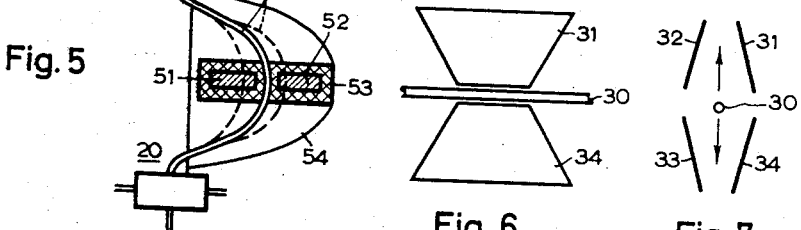
Fig. 6
Fig. 7

United States Patent Office 2,877,397
Patented Mar. 10, 1959

2,877,397
LOOP REGULATING SYSTEMS FOR THE SPEED CONTROL OF ROLL DRIVES

Hans Poschner and Hans-Günther Vogelsang, Erlangen, Germany, assignors to Siemens-Schuckertwerke Aktiengesellschaft, Berlin-Siemensstadt, Germany, a corporation of Germany Application November 5, 1954, Serial No. 467,136

Claims priority, application Germany November 7, 1953

14 Claims. (Cl. 318—6)

Our invention relates to systems for regulating the traveling speed of strand material in response to variations in size of a loop formed by the traveling material, such loop-responsive regulation being used in continuously operating rolling mills for the manufacture of wire, strip or profiled stock and also in analogous processes in the paper, textile, plastic and rubber industries.

Loop regulators of this kind are called upon to maintain the size of the loop, formed by the traveling material between two roll stands or processing stands, within predetermined limits. On account of the high traveling speed of the material, the response of the regulator to departures of the loop from these limits must be as free of inertia as possible. For minimizing the manufacturing tolerances of the material, particularly when processing profiled stock, no appreciable mechanical stress should be imposed upon the material by the action of the regulator. It is further desired to have a continuous regulating performance in order to secure a quiet run of the material through the loop-forming portion, thus relieving the processing plant as much as possible from sudden changes or impacts in load.

To meet these requirements, it has become known, in the processing of electrically conducting material, to provide a capacitive loop regulator which comprises an electrode located opposite the loop of material. The magnitude of the electric capacitance between the electrode and the loop varies with the size of the loop and serves for controlling the speed of the motor driving the material.

The above-mentioned and more specific objects and features of my invention will be described in the following with reference to the drawing in which Fig. 1 relates to prior art. It illustrates a capacitative loop regulator employing an electrode spaced from grounded electro-conductive strip material.

Fig. 2 illustrates, schematically and partly in section, an embodiment of a loop-regulator system constructed in accordance with the present invention. The system is employed as part of a wire rolling mill. The wire is grounded, as in Fig. 1, and the rolls of Fig. 1 are applicable in the system of Fig. 2.

Fig. 3 illustrates another embodiment of the invention. In this system the strip material may be either electrically conductive or nonconductive, and is in the form of a tape.

Fig. 4 is a lateral view, partly in section, of still another embodiment. The strip of material is looped, the loop being disposed approximately horizontally, or at a slight tilt, above a supporting table. The two electrodes of the sensing capacitative element are enclosed in the table.

Fig. 5 is a top view of the embodiment of Fig. 4.

Fig. 6 is a lateral view and Fig. 7 a front view of a modified electrode arrangement applicable in a loop regulator system otherwise designed in accordance with the preceding embodiments of the invention.

Fig. 1 of the drawing shows schematically an example of such a capacitive loop regulator as applied to a strip rolling mill. The strip material 30 runs between two roll stands 10 and 20 and forms a drooping loop between the two stands. A measuring electrode 15 is disposed beneath the loop and forms part of a capacitor whose other electrode consists of the traveling material 30. The capacitor is electrically connected in a medium-frequency or high-frequency measuring circuit energized from a generator device 16. The capacitance of the capacitor varies with the size cf the loop. The device 16 also comprises measuring and control means which translate the capacitance variation into a variable voltage. This voltage is applied to the field winding of the drive motor 21 for the stand 20. As a result, the field excitation of drive motor 21 is adjusted in accordance with the variations in capacitance to the effect that the distance of the loop from the measuring electrode 15 remains constant. It is also known to insert into the measuring circuit a capacitor consisting of two electrode plates which are mounted beside each other and are capacitively coupled with each other by the material passing between the plates. A change in loop size causes a corresponding change in the degree of coupling effective between the two electrodes and thus results in a corresponding change in capacitance effective in the measuring circuit.

Such capacitive loop-regulator systems have the disadvantage of being extremely sensitive to changes in cross section of the traveling material and also to lateral deflection of the material from the normal position. Both occurrences result in a change in measuring capacitance and thus simulate a change in loop size with the result of causing a faulty regulating operation.

It is an object of our invention to improve capacitive loop regulators toward eliminating the just-mentioned deficiencies and sources of errors.

To this end and in accordance with a feature of our invention, we provide two capacitor electrode means in a differential circuit connection. According to another feature, we dispose two electrodes or pairs of electrodes behind one another in the direction of the loop-forming deflection of the material, and locate these electrodes laterally of the loop of traveling material so that a change in the size of the loop causes mutually inverse changes in the capacitance values of the respective two electrode means.

The system illustrated in Fig. 2 forms part of a wire rolling mill. The grounded wire material 30 being processed passes between two roll stands (not shown in Fig. 2) through a pit or channel 39, the direction of travel of the material being perpendicular to the plane of illustration. The material 30 forms a loop within the channel 39. The lowermost point of the loop has normally the position shown by a full line and indicated by 0. When the loop is too shallow, the material has the position indicated by a broken line at 1; and when the loop is too large the material has the broken-line position indicated at 2. Mounted within the channel 39 are two arrangements of measuring electrodes each consisting of two conductively interconnected electrodes 31, 32 and 33, 34. The two arrangements are disposed one behind the other in the direction of the loop-forming deflection of the material. That is, the two pairs of electrodes are disposed one above the other so that the plane of the loop formed by the traveling material is located between the two electrodes of each pair. The arrangement functions as a differential capacitor. When the loop departs upwardly from the normal position, the capacitance of the traveling material 30 versus the electrode pair 31, 32 increases, and the capacitance versus the electrode pair 33, 34 decreases. Analogously, when the loop departs downwardly from the normal position, the changes in capacitance occur in the inverse sense. The capacitance of the upper and the lower electrode pairs relative to the material 30 are effective in respective oscillatory circuits in the devices 35 and 36 each of which, if desired, may also comprise a power amplifying stage. The changes in capacitance are translated in devices 35 and 36 into corresponding voltages. These voltages are supplied to a power amplifier 37 to control this amplifier in push-pull operation. The power amplifier 37 may consist of a magnetic amplifier or an electronic tube amplifier, for example.

When the material 30 being processed occupies the normal loop position 0, the voltage at the output terminals of the power amplifier 37 is zero. When the loop deflects upwardly (position 1) a direct voltage of one polarity occurs at the output terminals of the power amplifier 37, and when the material deflects downwardly (position 2) a direct voltage of the opposite polarity appears. The polarity and magnitude of the power amplifier output voltage thus is a measure of the direction and amount of loop deflection of the material. This output voltage is either used for controlling the speed of one of the two motors driving the respective rolling stands, or for controlling the difference or ratio of the speeds of the two motors driving the respective stands, both ways of speed control being known and customary for such purposes. In Fig. 2, for instance, the power amplifier 37 is shown to have its output terminals connected to the field winding of a drive motor 21 for one of the two roll stands in accordance with Fig. 1. In addition, of course, the other drive motors of the same processing line may be controlled accordingly and in response to the same output voltage, in order to prevent the occurrence of undesired loop changes at another place of the same processing line.

An essential characteristic of the above-described system according to the invention lies in the fact that there are two measuring electrodes disposed one behind the other in the direction of loop deflection, and that the respective capacitance values relative to ground or relative to the grounded strand material are differentially compared with each other in a push-pull stage jointly controlled by the capacitance values. As a result, the zero position of the loop is entirely independent of the particular cross section of the strand material. The subdivision of the measuring electrodes into conductively interconnected electrode pairs between which the traveling strand material is located, has the advantage that lateral movements of the material remain virtually without influence upon the measuring result. This is of importance with a suspended arrangement of the loop material wherein deflections of the loop in the upward and downward direction are to be responded to, while lateral deflections are to have no effect upon the measuring result. The desired normal position of the loop can be adjusted either by changing the position of the electrodes, i. e. by jointly displacing the electrodes in the upward or downward direction, or also by purely electrical adjusting means in the device 35 to 37.

To prevent the strand material from directly contacting the measuring electrodes in the event of operating trouble in the strand processing line, the electrodes may be insulated as shown in Fig. 2. The insulation of the electrodes 31 to 34 consists preferably of ceramic material. In cases where the mechanical stresses imposed upon such insulating coverings may become too large, suitable deflector means of sufficiently rugged design may be used instead. In such cases, according to another feature of the invention, the electrodes themselves may be designed as massive steel plates of sufficient strength to safely withstand all possibly occurring mechanical stresses. Such electrode plates are preferably so mounted that they can be turned away from their normal position or can be pulled upwardly out of their normal position in order to permit restoring normal working conditions if, after the occurrence of trouble, the space between the electrodes should be filled by an accumulation of strand material.

As mentioned, the system according to Fig. 2 is equipped with a trough or channel 39 within which the electrode arrangement and the loop of material are located and which screens these parts toward the outside. The trough 39 may consist of a pit formed or lined by masonry, or of walls formed by wire mesh. Such a mechanical or also electrical screening of the capacitively operating parts of the system toward the outside is preferable in order to prevent extraneous bodies from affecting the control and regulating operation. The electrodes may be embedded in the lateral walls of the pit or they may be mounted on these walls.

Fig. 3 shows a somewhat modified embodiment in which the two pairs of electrodes 41, 42 and 43, 44 form each a complete capacitor. The plane of the loop of strand material, which in this case is represented by strip material and denoted by 40, is located between the electrode plates as in the embodiment of Fig. 2. Such an arrangement can be applied with electrically conducting material which is grounded, as well as with insulating material such as paper, rubber, or synthetic plastics. In the former case, the traveling strand material acts as a control electrode within the electrical field of the capacitors 41, 42 and 43, 44. In the latter case, a local variation of the dielectric is produced which likewise causes a change in capacitance and thus affords a positional regulation of the loop of material on the basis of the above described principle. The modification according to Fig. 3 also affords a satisfactory regulation independently of the particular cross section of the traveling material and also independently of lateral displacements of the plane of the loop.

Figs. 4 and 5 show a lateral view and top view respectively of a system in which the plane of the loop of material extends in an approximately horizontal direction. Such a horizontal arrangement is used, for instance, in the production of stock material having a profiled cross sectional shape of non-uniform moduli of elasticity, the material running on one of the short edges of the profile during passage of the material through the rolling mill. In Figs. 4 and 5 the strand material is denoted by 50. The two roll stands are designated by 10 and 20. The system is equipped with two electrode plates 51 and 52. These plates are located in a recess 53 of a loop-supporting table 54 which extends between the stands 10 and 20 in the horizontal or in a slightly inclined direction. The electrode plates 51 and 52 may be embedded within an insulating material, for instance of ceramic substance, filled into the recess 53. The insulating filling material, however, may be omitted if suitable structural means are provided to prevent a conductive contact between the material being processed and the electrode plates. The remaining electrical portion of the system is similar to that described with reference to Fig. 2. The strip 50 is grounded, as in Fig. 1 and in the system of Fig. 2. In the embodiment of Figs. 4 and 5, a sub-division of the electrodes into pairs is not necessary because the plane of the loop in this case is definitely defined by the table surface.

In all embodiments described in the foregoing, it may be of advantage to give the respective electrodes different widths in the direction of loop deflection in order to obtain a desired characteristic of the regulator controlled by the electrode arrangement. Such electrode plates of varying width are illustrated in Fig. 6. Instead or besides, the distances of respective joints or ends of each electrode from the plane of the loop in the direction of loop deflection may be made different as illustrated in Fig. 7. The reference numerals in Figs. 6 and 7 are in accordance with those used in Fig. 2. Indeed, the two modifications exemplified by Figs. 6 and 7 may both be incorporated in a system otherwise similar to that described with reference to Fig. 2.

It will be obvious to those skilled in the art upon a study of this disclosure, that the invention permits of various modifications and may be embodied in apparatus other than those specifically illustrated and described, without departing from the essence of the invention and within the scope of the claims annexed hereto.

We claim:

1. With a processing line for strand material having drive means for imparting traveling movement to said material, said material when traveling having a deflected portion forming a loop, in combination, a loop regulating system comprising two electrode surface means disposed laterally of the plane of the loop and extending substantially parallel to said plane, one of said electrode surface means being disposed on the convex side of the loop and the other electrode surface means being disposed on the concave side of the loop when the loop is in a predetermined position, the two electrode means forming with the strand material two capacitors, respectively, whose capacitances vary differentially in one sense as the size of the loop increases and in the opposite sense as the size of the loop decreases whereby a variation in size of the loop causes mutually inverse changes in electric capacitance to occur at said respective electrode surface means, and electric control means connected between said two electrode surface means and said drive means for controlling the speed of said drive means in response to said changes in capacitance to maintain said loop size constant.

2. With a strand-material processing line having strand material traveling along a given path, drive means of controllable speed for imparting traveling movement to said material, said material when traveling having a portion deflecting from said path and forming a loop, in combination, a loop regulating system comprising two pairs of electrodes, each pair having its two electrodes disposed on opposite sides respectively of the loop in spaced relation to the plane of the loop, the pairs being offset from each other in a direction transverse to the strand and longitudinally of the plane of the loop and the two electrodes of each pair forming together with the material of the loop a capacitor having a capacitance determined by the position of the loop relative to said pair, whereby a variation in the size of the loop causes two mutually inverse changes in electric capacitance to occur in said respective capacitors, speed control means connected with said drive means and having two input circuits differentially related to each other, said two capacitors forming part of said respective input circuits for differentially controlling the speed of said drive means to maintain a constant loop size.

3. A loop regulating system comprising, in combination, a processing line for strand material having two mutually spaced processing stands defining a travel path for said material, drive means for imparting traveling motion to said material, a table structure disposed between said two stands and having an approximately horizontally table surface, said material when traveling being supported on said surface and having a lateral deflection from said path so as to form a loop on said surface, two capacitor electrodes disposed near said table surface in insulated relation to said loop and to each other, each of the electrodes being disposed laterally of the plane of the loop and offset from each other in a direction transverse to the travel path said two electrodes forming respective capacitors together with the loop-forming material, whereby a variation in size of the loop causes mutually inverse changes in capacitance of said two capacitors, and electric control means connected between said electrodes and said drive means for controlling the speed of said drive means in response to said changes in capacitance to maintain said loop size constant.

4. In a loop regulating system according to claim 3, said table having a recess in said table surface, a filling of insulating material in said recess, and said electrodes being embedded in said insulating material.

5. In a loop regulating system according to claim 1, said strand material being electrically conductive and being grounded, and said control means having two grounded input circuits each comprising one of said respective electrode means.

6. In a loop regulating system according to claim 1, said electrode means having an insulating covering on the electrode side facing said loop of material to prevent occurrence of contact between material and electrode means.

7. In a loop regulating system according to claim 1, said electrode means having a covering of insulating ceramic material on the side facing the loop of material.

8. In a loop regulating system according to claim 1, said electrode means consisting of rigid plates of steel.

9. With a strand-material processing system having strand material travelling along a given path, drive means of controllable speed for imparting travelling movement to said material, said material when travelling having a portion deflecting from said path and forming a loop, in combination, a loop regulating system comprising two pairs of capacitor electrodes, the electrodes of each pair being disposed one opposite the other on opposite sides respectively of the loop in spaced relation to and substantially parallel to the plane of the loop, the two pairs being one above the other, variation in size of the loop causing mutually inverse changes in electric capacitance to occur between the electrodes of said respective pairs, and electric control means connecting said electrode pairs with said drive means for controlling the speed of said drive means in response to said changes in capacitance to maintain said loop size constant.

10. Apparatus for controlling the travel of a strand of material, comprising drive means imparting travelling movement to the strand, circuit means connected to said drive means to control the speed of the drive means, the strand when travelling having a deflected portion forming a loop, the point of maximum deflection of the loop varying in position from a median position, two condenser electrodes forming part of said circuit means and disposed substantially parallel to and laterally of the plane of the loop, each electrode having its electrode surface extending transversely of the strand, the electrode surfaces extending in opposite directions from the median position, and generally longitudinally of the plane of the loop, the circuit means providing two electric circuit forming connections, each inclusive of one of said electrodes, variation in width of the loop causing mutually inverse changes in electric capacitance to occur at said respective electrodes in said two electric circuits, the circuit means including means responsive to said inverse changes in said two electric circuits to control the speed of the drive means to maintain a loop of substantially constant width.

11. Apparatus for controlling the travel of an electro-conductive strand of material, comprising drive means imparting travelling movement to the strand, circuit means connected to said drive means to control the speed of the drive means, the strand when travelling having a deflected portion forming a loop, the point of maximum deflection of the loop varying in position from a median position, two condenser electrodes forming part of said circuit means, each electrode having its electrode surface extending transversely of the strand, the electrode surfaces extending in opposite directions from the median position, and generally parallel to the plane of the loop in spaced relation thereto, the circuit means providing two electric circuit forming connections, each inclusive of one of said electrodes, the strand being common to both circuits, variation in width of the loop causing mutually inverse changes in electric capacitance to occur at said respective electrode means, in said two electric circuits, the circuit means including means responsive to said inverse changes to control the speed of the drive means to maintain a loop with substantially constant width.

12. Apparatus for controlling the travel of an electroconductive strand of material, comprising drive means imparting travelling movement to the strand, circuit means connected to said drive means to control the speed of the drive means, the strand when travelling having a downwardly deflected portion forming a loop, the point of maximum depth of the loop varying in position from a median position, two pairs of condenser electrodes forming part of said circuit means, the electrodes of each pair being disposed at oposite sides of the loop and being electrically connected to each other, each electrode having its electrode surface extending transversely of the strand, respective electrode surfaces of the pairs extending in opposite directions from the median position and generally parallel to the plane of the loop in spaced relation thereto, the circuit means providing two electric circuit forming connections, each inclusive of one of said pairs of electrodes, the strand being common to both circuits and forming a capacitor with each of said electrode pairs, variation in depth of the loop causing mutually inverse changes in electric capacitance to occur at said respective electrode means, the circuit means including means responsive to said inverse changes to control the speed of the drive means to maintain a loop with substantially constant width.

13. The apparatus defined in claim 3, each of the electrodes extending transversely of the strand material and longitudinally of the plane of the loop.

14. Apparatus for controlling the travel of a strand of conductive material, comprising drive means imparting traveling movement to the strand, said drive means including an electric motor, means connected to said motor for controlling the speed thereof, said strand when travelling having a loop lying in a plane, oscillation generating means, a pair of oscillatory circuits individually connected to said oscillation generating means, a pair of amplifiers each having its input connected to one of said oscillatory circuits, each of said oscillatory circuits including a capacitor having an electrode in proximity to the loop and lying in a plane parallel to the plane of the loop, the electrodes being arranged and shaped so that in a given position of the loop the capacitances of the loop to the two electrodes are equal, and a departure from said given position due to a change in size of the loop increases its capacitance relative to one electrode and decreases its capacitance relative to the other electrode, and means connecting the amplifiers to said motor speed control means for supplying thereto no appreciable current when said capacitances are equal and supplying thereto a direct current having a magnitude and direction corresponding to said departure of the loop from said given position, whereby variations in the size of the loop are minimized.

References Cited in the file of this patent
UNITED STATES PATENTS

| | | |
|---|---|---|
| 2,116,586 | Stoller | May 10, 1938 |
| 2,512,372 | Pakala | June 20, 1950 |
| 2,547,201 | Fegely | Apr. 3, 1951 |
| 2,661,009 | Dunnegan, Jr. et al. | Dec. 1, 1953 |
| 2,725,508 | Bailey et al. | Nov. 29, 1955 |